United States Patent
Rigazio et al.

(10) Patent No.: US 7,324,943 B2
(45) Date of Patent: Jan. 29, 2008

(54) VOICE TAGGING, VOICE ANNOTATION, AND SPEECH RECOGNITION FOR PORTABLE DEVICES WITH OPTIONAL POST PROCESSING

(75) Inventors: Luca Rigazio, Santa Barbara, CA (US); Robert Boman, Thousand Oaks, CA (US); Patrick Nguyen, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 144 days.

(21) Appl. No.: 10/677,174

(22) Filed: Oct. 2, 2003

(65) Prior Publication Data

US 2005/0075881 A1   Apr. 7, 2005

(51) Int. Cl.
G10L 21/00 (2006.01)
H04N 5/76 (2006.01)

(52) U.S. Cl. .................. 704/270; 704/251; 704/272; 348/231.3

(58) Field of Classification Search ................ 704/201, 704/251, 231, 243, 245, 252, 275, 272, 270
See application file for complete search history.

(56) References Cited

U.S. PATENT DOCUMENTS

| | | | |
|---|---|---|---|
| 4,951,079 A * | 8/1990 | Hoshino et al. | 396/56 |
| 5,729,741 A * | 3/1998 | Liaguno et al. | 704/270.1 |
| 6,101,338 A * | 8/2000 | Bernardi et al. | 396/287 |
| 6,360,234 B2 | 3/2002 | Jain et al. | |
| 6,397,181 B1 | 5/2002 | Li et al. | |
| 6,434,520 B1 | 8/2002 | Kanevsky et al. | |
| 6,462,778 B1 | 10/2002 | Abram et al. | |
| 6,499,016 B1 | 12/2002 | Anderson | |
| 6,721,001 B1 * | 4/2004 | Berstis | 348/231.3 |
| 6,934,461 B1 * | 8/2005 | Strub et al. | 386/46 |
| 6,996,251 B2 * | 2/2006 | Malone et al. | 382/100 |
| 7,053,938 B1 * | 5/2006 | Sherry | 348/231.4 |
| 2001/0056342 A1 * | 12/2001 | Piehn et al. | 704/3 |
| 2002/0022960 A1 * | 2/2002 | Charlesworth et al. | 704/251 |
| 2002/0099456 A1 * | 7/2002 | McLean | 700/83 |
| 2003/0083873 A1 * | 5/2003 | Ross et al. | 704/246 |
| 2004/0049734 A1 * | 3/2004 | Simske | 715/512 |

* cited by examiner

Primary Examiner—Tālivaldis Ivars Šmits
(74) Attorney, Agent, or Firm—Harness Dickey & Pierce P.L.C.

(57) ABSTRACT

A media capture device has an audio input receptive of user speech relating to a media capture activity in close temporal relation to the media capture activity. A plurality of focused speech recognition lexica respectively relating to media capture activities are stored on the device, and a speech recognizer recognizes the user speech based on a selected one of the focused speech recognition lexica. A media tagger tags captured media with generated speech recognition text, and a media annotator annotates the captured media with a sample of the user speech that is suitable for input to a speech recognizer. Tagging and annotating are based on close temporal relation between receipt of the user speech and capture of the captured media. Annotations may be converted to tags during post processing, employed to edit a lexicon using letter-to-sound rules and spelled word input, or matched directly to speech to retrieve captured media.

33 Claims, 5 Drawing Sheets

VOICE TAGGING, VOICE ANNOTATION, AND SPEECH RECOGNITION FOR PORTABLE DEVICES WITH OPTIONAL POST PROCESSING

FIELD OF THE INVENTION

The present invention generally relates to tagging of captured media for ease of retrieval, indexing, and mining, and particularly relates to a tagging and annotation paradigm for use on-board and subsequently with respect to a portable media capture device.

BACKGROUND OF THE INVENTION

Today's tasks relating to production of media, and especially production of multimedia streams, benefit from text labeling of media and especially media clips. This text labeling facilitates the organization and retrieval of media and media clips for playback and/or editing procedures relating to production of media. This facilitation is especially prevalent in production of composite media streams, such as a news broadcast composed of multiple media clips, still frame images, and other media recordings.

In the past, such tags have been inserted by a technician examining captured media in a booth at a considerable time after capture of the media with a portable media capture device, such as a video camera. This intermediate step between capture of media and production of a composite multimedia stream is both expensive and time consuming. Therefore, it would be advantageous to eliminate this step using speech recognition to insert tags by voice of a user of a media capture device immediately before, during, and/or immediately after a media capture activity.

The solution of using speech recognition to insert tags by voice of a user of a media capture device immediately before, during, and/or immediately after a media capture activity has been addressed in part with respect to still cameras that employ speech recognition to tag still images. However, the limited speech recognition capabilities typically available to portable media devices prove problematic, such that high-quality, meaningful tags may not be reliably generated. Also, a solution for tagging relevant portions of multi-media streams has not been adequately addressed. As a result, the need remains for a solution to the problem of high-quality, meaningful tagging of captured media on-board a media capture device with limited speech recognition capability that is suitable for use with multi-media streams. The present invention provides such a solution.

SUMMARY OF THE INVENTION

In accordance with the present invention, a media capture device has an audio input receptive of user speech relating to a media capture activity in close temporal relation to the media capture activity. A plurality of focused speech recognition lexica respectively relating to media capture activities are stored on the device, and a speech recognizer recognizes the user speech based on a selected one of the focused speech recognition lexica. A media tagger tags captured media with text generated by the speech recognizer, and tagging occurs based on close temporal relation between receipt of recognized user speech and capture of the captured media. A media annotator annotates the captured media with a sample of the user speech that is suitable for input to a speech recognizer, and annotating is based on close temporal relation between receipt of the user speech and capture of the captured media.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The system and method of the present invention obtains the advantage of eliminating the costly and time consuming step of insertion of tags by a technician following capture of the media. To accomplish this advantage, the present invention focuses on enabling insertion of tags by voice of a user of a media capture device immediately before, during, and/or immediately after a media capture activity. An optional, automated post-processing procedure improves recognition of recorded user speech designated for tag generation. Focused lexica relating to device-specific media capture activities improve quality and relevance of tags generated on the portable device, and pre-defined focused lexica may be provided online to the device, perhaps as a service of a provider of the device.

Out-of-vocabulary words still result in annotations suitable for input to a speech recognizer. As a result a user who recorded the media can use the annotations to retrieve the media content using sound similarity metrics to align the annotations with spoken queries. As another result, the user can employ the annotations with spelled word input and letter-to-sound rules to edit the lexicon on-board the media capture device and simultaneously generate textual tags. As a further result, the annotations can be used by a post-processor having greater speech recognition capability than the portable device to automatically generate text tags for the captured media. This post-processor can further convert textual tags associated with captured media to alternative textual tags based on predetermined criteria relating to a media capture activity. Automated organization of the captured media can further be achieved by clustering and indexing the media in accordance with the tags based on semantic knowledge. As a result, the costly and time consuming step of post-capture tag insertion by a technician can be eliminated successfully. It is envisioned that captured media may be organized or indexed by clustering textual tags based on semantic similarity measures. It is also envisioned that captured media may be organized or indexed by clustering annotations based on acoustic similarity measures. It is further envisioned that clustering can be accomplished in either manner onboard the device or on a post-processor.

Figure 1:
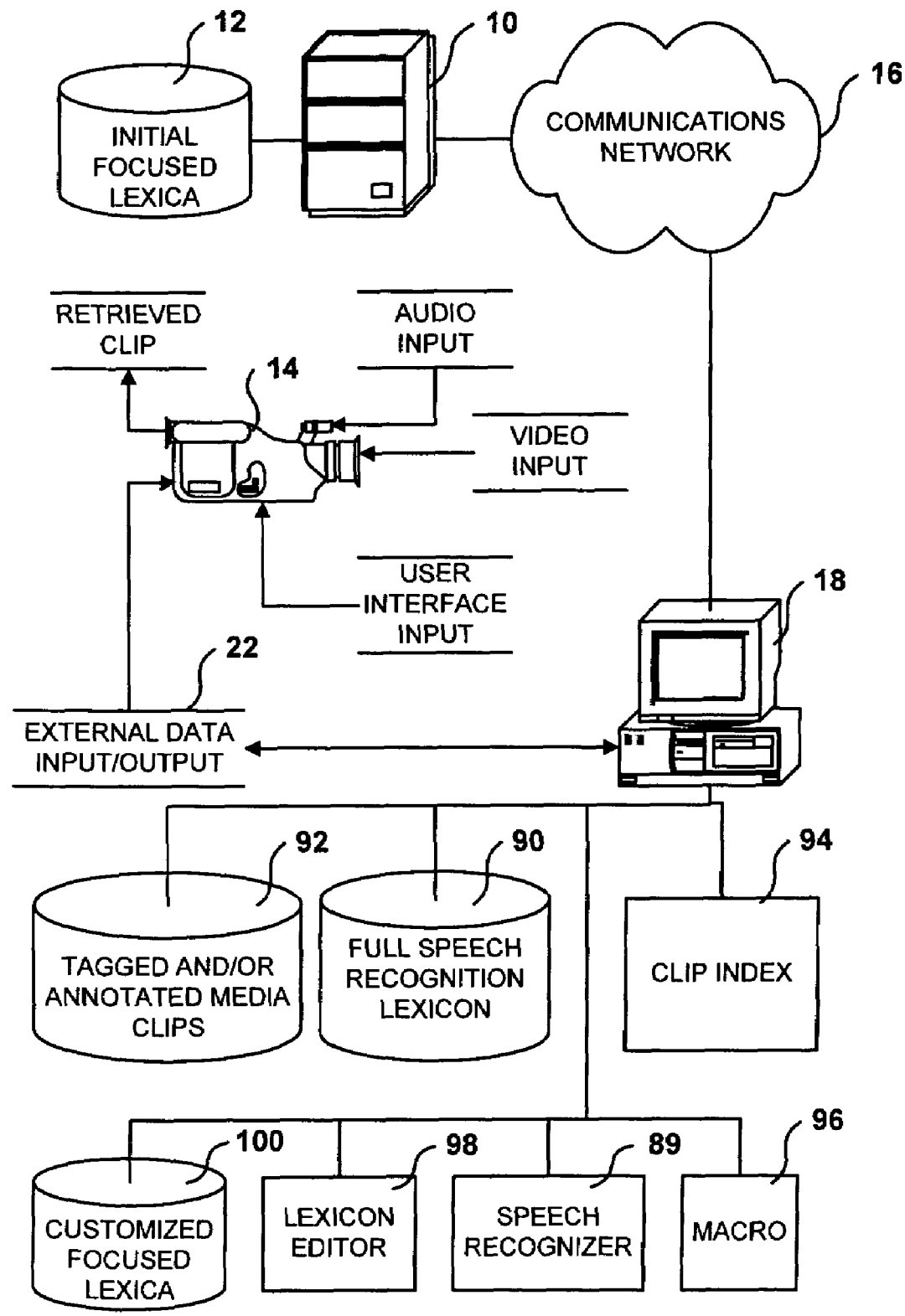
FIG. 1 is an entity relationship diagram depicting a media tagging system according to the present invention.

The entity relationship diagram of FIG. 1 illustrates an embodiment of the present invention that includes a lexica source 10 distributing predefined, focused lexica 12 to a media capture device 14 over a communications network 16, such as the Internet. A manufacturer, distributor, and/or retailer of one or more types of media capture devices 14 may select to provide source 10 as a service to purchasers of device 14, and source 10 may distribute lexica 12 to different types of devices based on a type of device 14 and related types of media capture activities performed with such a device. For example, lexica relating to recording music may be provided to a digital sound recorder and player, but not to a still camera. Similarly, lexica relating to recording specific forms of wildlife, as with bird watching activities, may be provided to a still camera, but not to a digital recorder and player. Further, both types of lexica may be provided to a video camera. As will be readily appreciated, the types of media capture activities that may be performed with device 14 are limited by the capabilities of device 14, such that lexica 12 may be organized by device type according to capabilities of corresponding devices 14.

Device 14 may obtain lexica 12 through post-processor 18, which is connected to communications network 16. It is envisioned, however, that device 14 may alternatively or additionally be connected, perhaps wirelessly, to communications network 16 and obtain lexica 12 directly from source 10. It is further envisioned that device 14 may access post-processor 18 over communications network 16, and that post processor 18 may further be provided as a service to purchasers of device 14 by a manufacturer, distributor, and/or retailer of device 14. Accordingly, source 10 and post-processor 18 may be identical.

Figure 2:
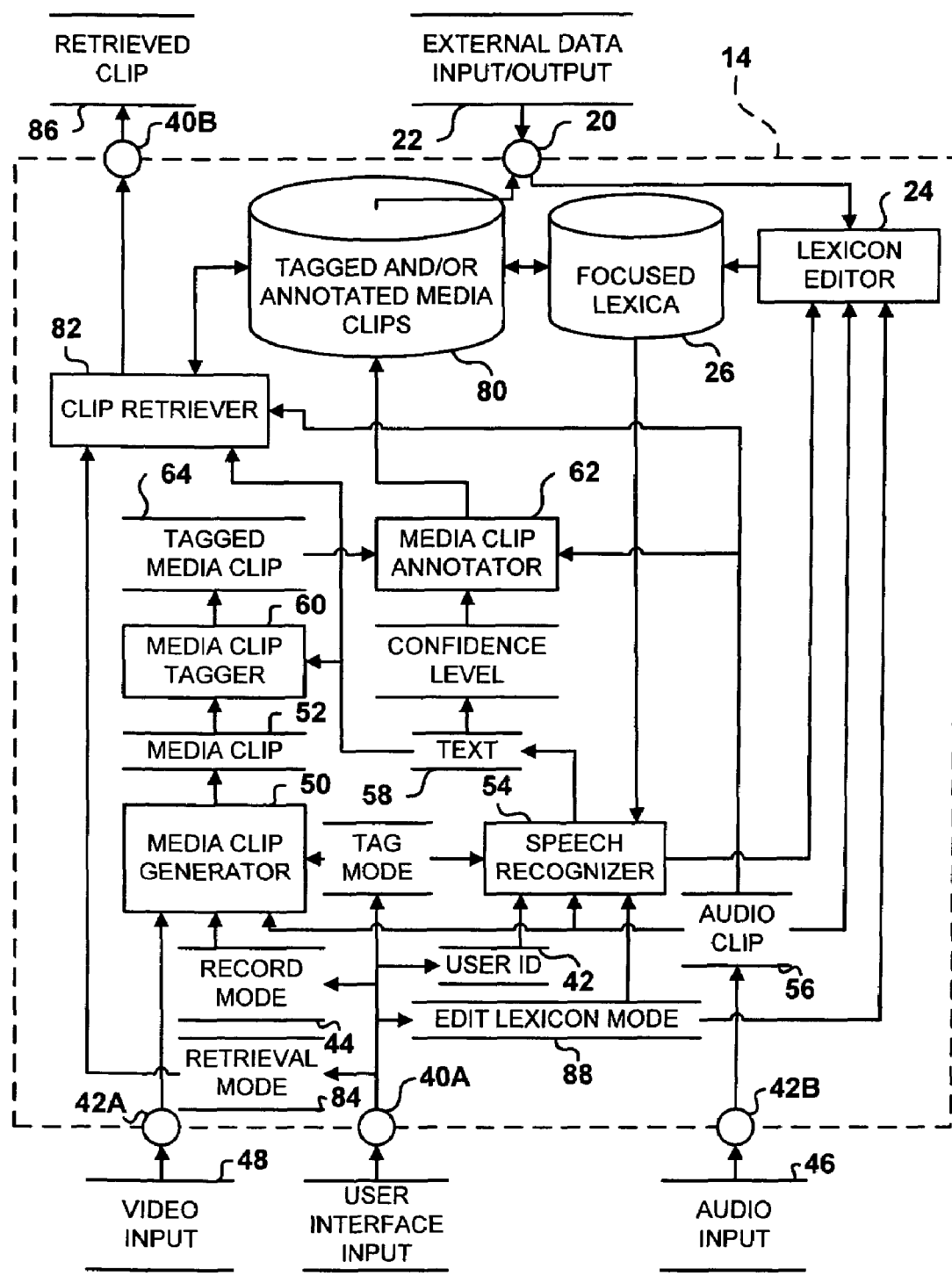
FIG. 2 is a block diagram depicting a media capture device according to the present invention.
Figure 3:
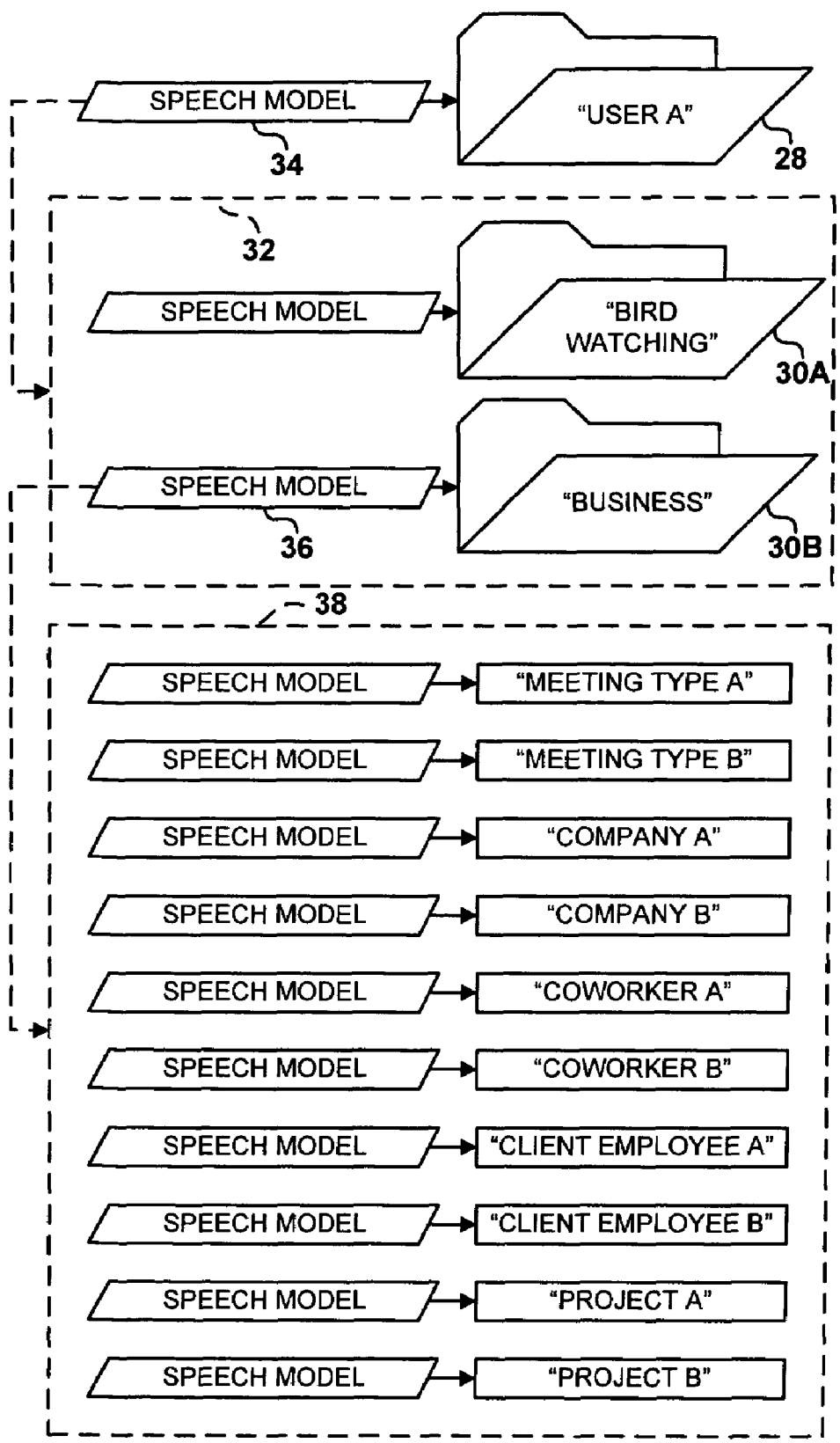
FIG. 3 is a block diagram depicting focused lexica according to the present invention.

FIG. 2 illustrates an embodiment of device 14 corresponding to a video camera. Accordingly, predefined and/or edited focused lexica arrive at external data interface 20 of device 14 as external data input/output 22. Lexicon editor 24 stores the lexica in lexica datastore 26. The lexica preferably provide a user navigable directory structure for storing captured media, with each focused lexicon associated with a destination folder of a directory tree structure illustrated in FIG. 3. For instance, a user folder 28 for storing media of a particular user contains various subfolders 30A and 30B relating to particular media capture activities. Each folder is preferably voice tagged to allow a user to navigate the folders by voice employing a system heuristic that relates matched speech models to folders and subfolders entitled with a descriptive text tag corresponding to the speech models.

Threads relate matched speech models to groups of speech models. For example, a user designated as "User A" may speak the phrase "User A" into an audio input of the device to specify themselves as the current user. In response, the device next employs folder lexicon 32 for "User A" based on the match to the voice tag 34 for user folder 28. Thus, when the user next speaks "Business" and the device matches the speech input to voice tag 36 for sub-folder 30B, two things occur. First, sub-folder 30B is selected as the folder for storing captured media. Second, focused lexicon 38 is selected as the current speech recognition lexicon. A user lexicon containing voice tag 34 and other voice tags for other users is also active so that a new user may switch users at any time. Thus, a switch in users results in a shift of the current lexicon to a lexicon for the subfolders of the new user.

Returning to FIG. 2, a user interface 40A is also provided to device 14 that includes user manipulable switches, such as buttons and knobs, that can alternatively or additionally be used to specify a user identity or otherwise navigate and select the focused lexica. An interface output 40B is also provided in the form of an active display and/or speakers for viewing and listening to recorded media and monitoring input to video and audio inputs 42A and 42B. In operation, a user may select a focused lexicon and press a button of interface 40A whenever he or she wishes to add a voice tag to recorded media. For example, the user may select to start recording by activating a record mode 44, and add a voice tag relating to what the user is about to start recording. Audio and video input 46 and 48 are combined by media clip generator into a media clip 52. Also, the portion of the audio input 46 that occurred during the pressing of the button is sent to speech recognizer 54 as audio clip 56. This action is equivalent to performing speech recognition on an audio portion of the media clip during pressing of the button.

Speech recognizer 54 employs the currently selected focused lexicon of datastore 26 to generate recognition text 58 from the user speech contained in the audio clip 56. In turn, media clip tagger 60 uses text 58 to tag the media clip 52 based on the temporal relation between the media capture activity and the tagging activity. Tagger 60, for example, may tag the clip 52 as a whole with the text 58 based on the text 58 being generated from user speech that occurred immediately before or immediately after the start of filming. This action is equivalent to placing the text 58 in a header of the clip 52. Alternatively, a pointer may be created between the text and a specific location in the media clip in which the tag is spoken. Further, media clip annotator 62 annotates the tagged media clip 64 by storing audio clip 56 containing a sample of the user speech suitable for input to a speech recognizer in device memory, and instantiating a pointer from the annotation to the clip as a whole. This action is equivalent to creating a pointer to the header or to the text tag in the header. This action is also equivalent to creating a general annotation pointer to a portion of the audio clip that contains the speech sample.

Figure 4:
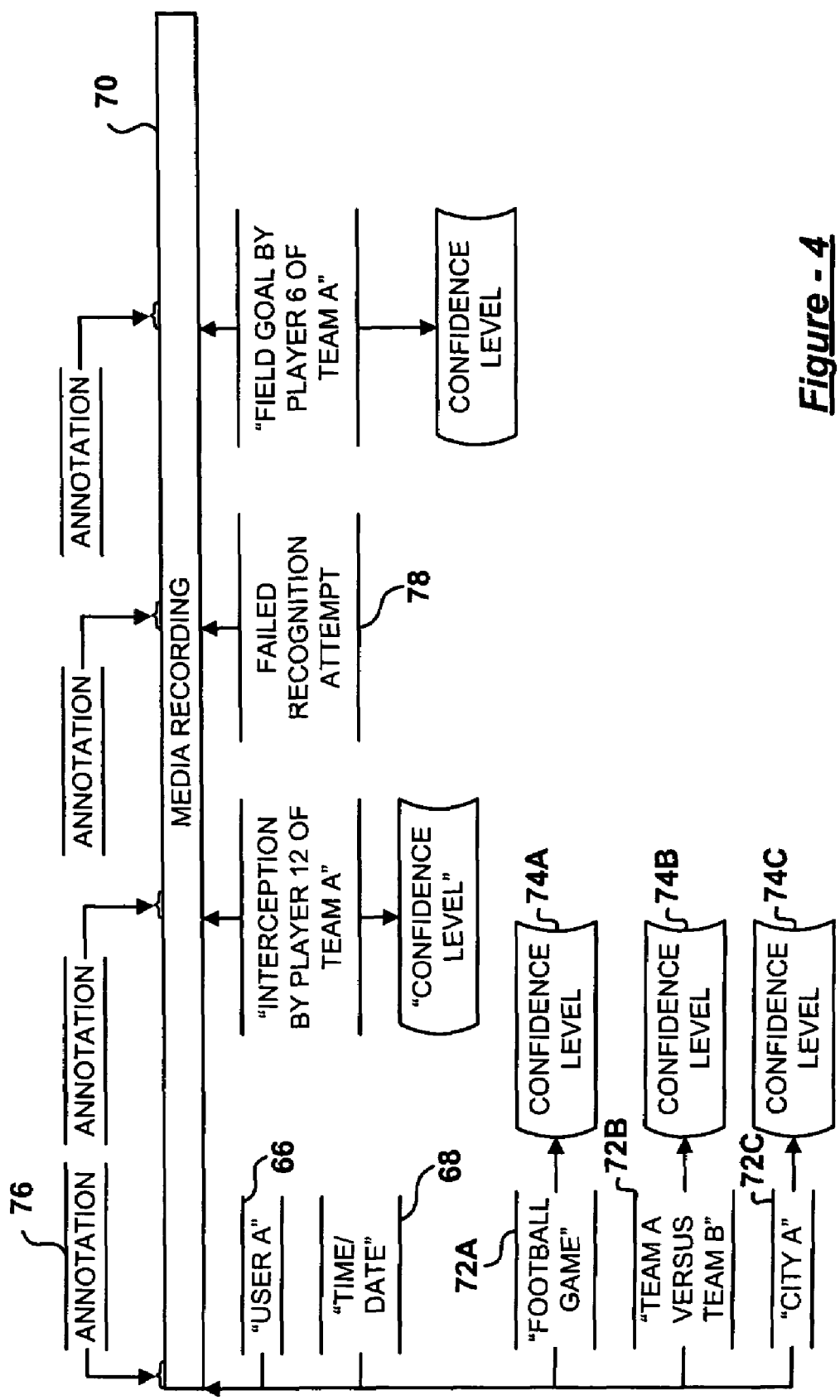
FIG. 4 is a block diagram depicting tagged and annotated media according to the present invention.

Results of tagging an annotation activity of a multimedia stream according to the present invention are illustrated in FIG. 4. This example employs pointers between textual tags and locations in the captured media based on a time at which the tagging occurred during filming of a sports event such as a football game. Also, a user identifier 66 and time and date 68 of the activity are recorded in relation to the media stream 70 at the beginning of the stream 70 as a type of header. Further, the user may select a prepared, focused lexicon for recording sports events and identify the type of sports event, the competitors and the location at the beginning of the media stream 70. As a result, and textual tags 72A-C are recorded in relation to the beginning of the media stream with information relating to the confidence levels 74A-C of the respective recognition attempts. A predetermined offset from the pointer identifies the portion of the media stream 70 in which the annotation 76 is contained for tags 72A-C. Subsequent tagging attempts result in similar tags, and failed recognition attempts 78 are also recorded so that an related annotation is created by virtue of the pointer and offset. It is envisioned that alternative tagging techniques may be employed, especially in the case of instantaneously captured media, captured media having no audio component, and/or captured media with multiple, dedicated audio inputs. For example, a still camera may record annotations and any successfully generated tags with general pointers from recording of user speech and related text to a digitally stored image. Also, a video cassette recorder may record a multimedia broadcast received on a cable, and may additionally receive user speech via a microphone of a remote control device and record it separately. Thus, the user annotation need not be integrated into the multimedia stream.

Returning to FIG. 2, tagged and/or annotated captured media 80 stored in the directories provided by the focused lexica may be retrieved by the user employing clip retriever 82. Accordingly, the user enters a retrieval mode 84 and utters a speech query. Speech recognizer 54 is adapted to recognize the speech query using the corpus of the focused lexica of datastore 26, and to match recognition text to tags of the captured media. A list of matching clips are thus retrieved and presented to the user for final selection via interface output 40B, which communicates the retrieved clip 86 to the user. Also, speech recognizer 54 is adapted to use sound similarity metrics to align the annotations with spoken queries, and this technique reliably retrieves clips for a user who made the annotation. Thus, speech recognizer may take into account which user is attempting to retrieve clips when using this technique.

Annotations related to failed recognition attempts or low confidence tags may be presented to the user that made those annotations for editing. For low confidence tags, the user may confirm or deny the tags. Also, the user may enter a lexicon edit mode and edit a lexicon based on an annotation using spelled word input to speech recognizer 54 and letter to sound rules. Speech recognizer 54 also creates a speech model from the annotation in question, and lexicon editor 24 constructs a tag from the text output of recognizer 54 and adds it to the current lexicon in association with the speech model. Finally, captured media 80 may be transmitted to a post-processor via external data interface 20.

Returning to FIG. 1, post-processor 18 has speech recognizer 89 that is enhanced compared to that of device 14. In one respect, the enhancement stems from the use of full speech recognition lexicon 90, which has a larger vocabulary than the focused lexica of device 14. Post-processor 18 thus receives at least annotations from device 14 in the form of external data input/output 22, performs speech recognition on the received annotations to generate textual tags for the related, captured media. In one embodiment, post-processor 18 is adapted to generate tags for annotations associated with recognition attempts that failed and/or that produced tags of low confidence. It is envisioned that post-processor 18 may communicate the generated tags to device 14 as external data input/output 22 for association with the related, captured media. It is further envisioned that post-processor 18 may receive the related and possibly tagged, captured media as external data input/output 22, and store the tagged and/or annotated media in datastore 92. In such a case, post-processor 18 may supplement the annotated media of datastore 92 by adding tags to captured media based on related annotations. Additionally, post-processor 18 may automatically generate an index 94 for the captured media of datastore 92 or stored on device 14 using semantic knowledge, clustering techniques, and/or mapping module 96.

Semantic knowledge may be employed in constructing index 94 by generating synonyms for textual tags that are appropriate in a context of media capture activities in general, in a context of a type of media capture device, or in a context of a specific media capture activity. Image feature recognition can further be employed to generate tags, and the types of image features recognized and/or tags generated may be focused toward contexts relating to media capture activities, devices, and/or users. For example, a still camera image may be recognized as a portrait or landscape and tagged as such.

Clustering techniques can further be employed to categorize and otherwise commonly index similar types of captured media, and this clustering may be focused toward contexts relating to media capture activities, devices, and/or users. For example, the index may have categories of "portrait", "landscape", and "other" for still images, while having categories of "sports", "drama", "comedy", and "other" for multimedia streams. Also, subcategories may be accommodated in the categories, such as "mountains", "beaches", and "cityscapes" for still images under the "landscape" category.

Mapping module is adapted to convert textual tags associated with captured media to alternative textual tags based on predetermined criteria relating to a media capture activity. For example, the names and numbers of players of a sports team may be recorded in a macro and used during post-processing to convert tags designating player numbers to tags designating player names. Such macros may be provided by a manufacturer, distributor, and/or retailer of device 14, and may also focus toward contexts relating to media capture activities, devices, and/or users. The index 94 developed by post-processor 18 may be developed based on captured media stored on device 14 and further transferred to device 14. Thus, the post-processor 18 may be employed to enhance functionality of device 14 by periodically improving recognition of annotations stored on the device and updating an index on the device accordingly. It is envisioned that these services may be provided by a manufacturer, distributor, and/or retailer of device 14 and that subscription fees may be involved. Also, storage services for captured media may be additionally provided.

Any of the mapping, semantics, and/or clustering may be customized by a user as desired, and this customization ability is extended toward focused lexica as well. For example, the user may download initial focused lexica 12 from source 10 and edit the lexica with editor 98, employing greater speech recognition capability to facilitate the editing process compared to an editing process using spelled word input on device 14. These customized lexica can be stored in datastore 100 for transfer to any suitably equipped device 14 that the user selects. As a result, the user may still obtain the benefits of previous customization when purchasing additional devices 14 and/or a new model of device 14. Also, focused lexica that are edited on device 14 can be transferred to datastore 100 and/or to another device 14.

Figure 5:
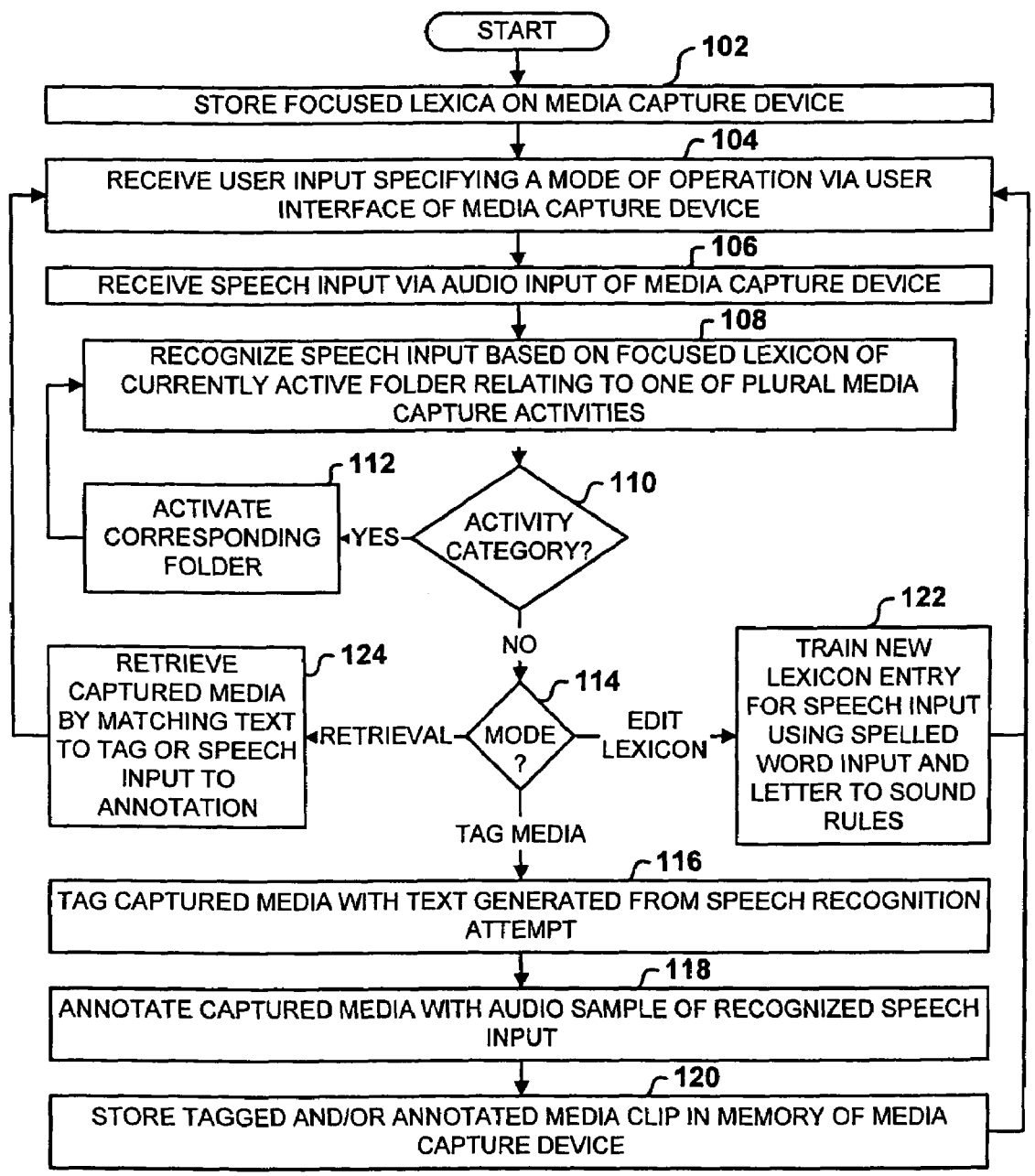
FIG. 5 is a flow diagram depicting a media tagging method for use with a media capture device according to the present invention.

The method according to the present invention is illustrated in FIG. 5, and includes storing focused lexica on the media capture device at step 102. It is envisioned that the lexica may be edited prior to transfer to the device. The method further includes step 104 of receiving user input specifying a mode of operation of the device. It is envisioned that the mode may be specified by manipulation of a switching mechanism of a manual user interface, and/or by speech input and keyword recognition. Step 104 also includes specification of a user identity by a switching mechanism, speech recognition, and/or voice print recognition. Step 106 includes receiving a user speech input via an audio input of the device, and this speech input is designated for operating the device during the previously specified mode of operation. Accordingly, the speech input is recognized in step 108 based on a currently specified lexicon, which may be related to a specific media capture activity. Preferably, a lexicon containing names of folders corresponding to names of media capture activities remains open to supplement the current lexicon. Thus, if the recognized speech input corresponds as at 110 to one of the media capture activities, then the folder for that activity is activated at step 112. Activation of this folder causes the lexicon of that folder to be designated as the current lexicon, and processing returns to step 108. It is envisioned that modes of device operation may similarly be recognized by speech, and/or that folders may be selected by manual input from a user interface.

Speech input that does not designate a new mode or activity category is used to operate the device according to the designated mode. For example, if the device is in tag mode, then any text generated during the recognition attempt on the input speech using the folder lexicon at step 108 is used to tag the captured media at step 116. The speech sample is used to annotate the captured media at step 118, and the captured media, tag, and annotation are stored in association with one another in device memory at step 120. Also, if the device is in lexicon edit mode, then a current lexicon uses letter to sound rules to generate a text from input speech for a selected annotation, and the text is added to the current lexicon in association with a speech model of the annotation at step 122. Further, if the device is in retrieval mode, then an attempt is made to match the input speech to either tags or annotations of captured media and to retrieve the matching captured media for playback at step 124. Additional steps may follow for interacting with an external post processor.

It should be readily understood that the present invention may be employed in a variety of embodiments, and is not limited to initial capture of media, even though the invention is developed in part to deal with limited speech recognition capabilities of portable media capture devices. For example, the invention may be employed in a portable MP3 player that substantially instantaneously records previously recorded music received in digital form. In such an embodiment, an application of the present invention may be similar to that employed with digital still cameras, such that user speech is received over an audio input and employed to tag and annotate the compressed music file. Alternatively or additionally, the present invention may accept user speech during playback of downloaded music and tag and/or annotate temporally corresponding locations in the compressed music files. As a result, limited speech recognition capabilities of the MP3 player are enhanced by use of focused lexica related to download and/or playback of compressed music files. Thus, download and/or playback of previously captured media may be interpreted as a recapture of the media, especially where tags and/or annotations are added to recaptured media.

It should also be readily understood that the present invention may be employed in alternative and/or additional ways, and is not limited to portable media capture devices. For example, the invention may be employed in a non-portable photography or music studio to tag and annotate captured media based on focused lexica, even though relatively unlimited speech recognition capability may be available. Further, the present invention may be employed in personal digital assistants, lap top computers, cell phones and/or equivalent portable devices that download executable code, download web pages, and/or receive media broadcasts. Still further, the present invention may be employed in non-portable counterparts to the aforementioned devices, such as desk top computers, televisions, video cassette recorders, and/or equivalent non-portable devices. Moreover, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A media capture device, comprising:
a media capture mechanism;
an audio input receptive of user speech relating to a media capture activity in close temporal relation to the media capture activity;
a plurality of focused speech recognition lexica respectively relating to media capture activities;
a user interface having a menu structure of hierarchically organized folders named by media capture activities and adapted to permit a user to navigate between and select one of the lexica by selecting one of the folders in which to store the captured media;
a speech recognizer adapted to recognize the user speech based on a selected one of the focused speech recognition lexica;
a media tagger adapted to tag captured media with text generated by said speech recognizer based on close temporal relation between receipt of recognized user speech and capture of the captured media; and
a media annotator adapted to annotate the captured media with a sample of the user speech that is suitable for input to a speech recognizer based on close temporal relation between receipt of the user speech and capture of the captured media.

2. The device of claim 1, further comprising an input receptive of a user identity, wherein said speech recognizer is adapted to recognize user speech based on the user identity.

3. The device of claim 2, wherein said speech recognizer is adapted to employ focused lexica based on the user identity.

4. The device of claim 1, wherein said speech recognizer is adapted to select a lexicon based on the user speech and a predefined heuristic relating to voice tags associated with the lexica.

5. The device of claim 1, further comprising a media retrieval mechanism adapted to retrieve captured media from memory of the device by matching a tag of the captured media to recognition text generated form user speech received and recognized during a retrieval mode of the device.

6. The device of claim 1, further comprising a media retrieval mechanism adapted to retrieve captured media from memory of the device by matching an annotation of the captured media to user speech received during a retrieval mode of the device using sound similarity metrics to align an annotation with a spoken query.

7. The device of claim 1, further comprising a lexicon editor adapted to supplement a lexicon based on an annotation, letter to sound rules, and user speech corresponding to spelled word input received and recognized during a lexicon edit mode of the device.

8. The device of claim 1, further comprising an external data interface adapted to transmit annotations to a post processor having greater speech recognition capabilities than said device.

9. The device of claim 1, further comprising:
an external data interface receptive of lexicon contents; and a lexicon editor adapted to store the lexicon contents in device memory.

10. The device of claim 1, further comprising:

a lexica datastore in which the lexica provide a user navigable directory tree structure of folders including destination folders for storing the captured media, wherein each focused lexicon is associated with a destination folder of the directory tree structure, and each folder is voice tagged to allow a user to navigate the folders by speech, and wherein said user interface is operably connected to access said lexica datastore and employ the directory tree structure as the menu structure by permitting a user to navigate between and select the lexica by opening the folders, wherein a lexicon containing names of the folders remains open to supplement the lexicon of a user-selected destination folder and thereby permit user selection of a new destination folder while the lexicon of the user-selected destination folder is active.

11. A media tagging system, comprising:

a portable media capture device adapted to capture media, to receive user speech in close temporal relation to a media capture activity, and adapted to annotate captured media with a sample of the user speech that is suitable for input to a speech recognizer based on close temporal relation between receipt of the user speech and capture of the captured media; and a post processor adapted to receive annotations from the device, permit a user to employ a user interface having a menu structure of hierarchically organized folders named by media capture activities and adapted to permit a user to navigate between and select one of a plurality of focused speech recognition lexica by selecting one of the folders in which to store the captured media, perform speech recognition on the annotations based on a selected one of the focused speech recognition lexica that respectively relate to media capture activities, and tag related captured media with text generated during speech recognition performed on the annotations.

12. The system of claim 11, comprising a source of predefined, focused lexica relating to media capture activities and adapted to communicate focused lexica to said media capture device according to device type over a communications network.

13. The system of claim 11, comprising a source of predefined, focused lexica relating to media capture activities and adapted to communicate focused lexica to said post-processor over a communications network.

14. The system of claim 11, comprising a lexicon editor provided to at least one of the device and the post processor and adapted to customize a focused lexicon for a user of the device.

15. The system of claim 11, comprising a mapping module adapted to convert textual tags associated with captured media to alternative textual tags based on predetermined criteria relating to a media capture activity.

16. The system of claim 11, wherein said device is adapted to perform a relatively limited amount of speech recognition on the annotation compared to an amount of speech recognition performed by said post-processor, the relatively limited amount being limited in at least one of time and search space due to at least one of relatively lower processing power and relatively lower memory capacity of said device, and to tag related captured media with recognition text generated during the relatively limited amount of speech recognition.

17. The system of claim 11, wherein said post-processor is receptive of captured media from said device, and is adapted to organize the captured media according to at least one of annotations and textual tags associated with the captured media, including clustering at least one of annotations and textual tags based on at least one of acoustic similarity measures and semantic similarity measures.

18. A media tagging method for use with a media capture device, comprising:

capturing media with the media capture device during a media capture activity conducted by a user of the device;

receiving user speech via an audio input of the device in close temporal relation to the media capture activity;

annotating captured media by storing the captured media in memory of the device in association with a sample of the user speech that is suitable for input to a speech recognizer;

permitting a user to navigate a menu structure of hierarchically organized folders named by media capture activities and thereby select by selecting one of the folders in which to store the captured media a focused speech recognition lexicon relating to the media capture activity from a plurality of focused lexica relating to media capture activities that are stored in memory of the device;

recognizing the user speech with a speech recognizer of the device employing a user-selected focused speech recognition lexicon relating to the media capture activity; and tagging captured media with recognition text generated during recognition of the user speech by storing the captured media in memory of the device in association with the recognition text.

19. The method of claim 18, wherein said step of selecting the focused speech recognition lexicon is based on the user speech and a predefined heuristic relating to voice tags associated with the lexica.

20. The method of claim 18, further comprising receiving a user identity, wherein said step of recognizing the user speech is based on the user identity.

21. The method of claim 20, further comprising selecting, based on the user identity, a focused speech recognition lexicon relating to the media capture activity from a plurality of focused lexica relating to media capture activities that are stored in memory of the device.

22. The method of claim 18, further comprising retrieving captured media from memory of the device by matching a tag of the captured media to recognition text generated form user speech received and recognized during a retrieval mode of the device.

23. The method of claim 18, further comprising retrieving captured media from memory of the device by matching an annotation of the captured media to user speech received during a retrieval mode of the device using sound similarity metrics to align an annotation with a spoken query.

24. The method of claim 18, further comprising supplementing a lexicon stored in device memory based on an annotation, letter to sound rules, and user speech corresponding to spelled word input received and recognized during a lexicon edit mode of the device.

25. The method of claim 18, further comprising receiving lexicon contents and storing the lexicon contents in device memory.

26. The method of claim 18, further comprising transferring annotations from the device to a post processor having greater speech recognition capability than the device.

27. The method of claim 26, further comprising:
performing speech recognition on annotations received from the device; and
tagging related captured media with text generated during speech recognition performed on the annotations.

28. The method of claim 26, comprising transferring focused lexica from a source of predefined, focused lexica to the post processor.

29. The method of claim 18, comprising transferring focused lexica from a source of predefined, focused lexica to the device.

30. The method of claim 18, comprising customizing a focused lexicon for a user of the device.

31. The method of claim 18, comprising convert textual tags associated with captured media to alternative textual tags based on predetermined criteria relating to a media capture activity.

32. The method of claim 18, further comprising organizing the captured media according to textual tags associated with the captured media, including clustering textual tags based on semantic similarity measures.

33. The method of claim 18, further comprising organizing the captured media according to annotations associated with the captured media, including clustering annotations based on acoustic similarity measures.

* * * * *

UNITED STATES PATENT AND TRADEMARK OFFICE
CERTIFICATE OF CORRECTION

PATENT NO. : 7,324,943 B2 Page 1 of 1
APPLICATION NO. : 10/677174
DATED : January 29, 2008
INVENTOR(S) : Luca Rigazio et al.

It is certified that error appears in the above-identified patent and that said Letters Patent is hereby corrected as shown below:

Column 8, Line 47, Claim 5:
"form" should be --from--

Column 10, Line 49, Claim 22:
"form" should be --from--

Signed and Sealed this

Twentieth Day of May, 2008

JON W. DUDAS
*Director of the United States Patent and Trademark Office*